(12) United States Patent
Yamashita et al.

(10) Patent No.: US 6,307,969 B1
(45) Date of Patent: *Oct. 23, 2001

(54) DYNAMIC IMAGE ENCODING METHOD AND APPARATUS

(75) Inventors: Hiroaki Yamashita, Fukuoka; Kiyoshi Sakai, Kanagawa; Takahiro Kobayakawa, Fukuoka, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,610

(22) Filed: Jul. 31, 1998

(30) Foreign Application Priority Data

Mar. 11, 1998 (JP) .................................. 10-059235

(51) Int. Cl.⁷ ......................................... G06K 9/36
(52) U.S. Cl. ............................. 382/236; 382/251
(58) Field of Search .................... 382/236, 251; 375/240.14; 348/388.1

(56) References Cited

U.S. PATENT DOCUMENTS

| 5,541,657 | * | 7/1996 | Yamamoto et al. ............... 348/388.1 |
| 5,592,226 | * | 1/1997 | Lee et al. ......................... 375/240.14 |
| 5,768,438 | * | 6/1998 | Etoh ...................................... 382/251 |

FOREIGN PATENT DOCUMENTS

| 4-3595 | 1/1992 | (JP) ................................ H04N/7/137 |
| 6-78292 | 3/1994 | (JP) ................................ H04N/7/137 |

* cited by examiner

*Primary Examiner*—Jose L. Couso
*Assistant Examiner*—Anh Hong Do
(74) *Attorney, Agent, or Firm*—Staas & Halsey LLP (57) ABSTRACT

A dynamic image encoding method and an apparatus therefor which apply to a hierarchical motion vector detection process using an SDRAM frame memory. A precedent process is executed sequentially for one rank of a reduced screen obtained after thinning out an input screen to memorize the result, and then a subsequent process is executed sequentially between the input screens for macro blocks of the reduced screen having provided the result of the precedent process so that the precedent and the subsequent process are repeated.

12 Claims, 12 Drawing Sheets

PRIOR ART

FIG .7

PRIOR ART

FIG.8

PRIOR ART

FIG.9

PRIOR ART

FIG.10

PRIOR ART

FIG.11

PRIOR ART

| FIRST STAGE PROCESS UNIT (QMB) → | <QMB1> | | | | <QMB2> | | | | <QMB3> | | | | <QMB4> | | | | ... |
|---|---|---|---|---|---|---|---|---|---|---|---|---|---|---|---|---|---|
| SECOND STAGE PROCESS UNIT (MB) → | 1 | 2 | 3 | 4 | 5 | 6 | 7 | 8 | 10 | 11 | 12 | 13 | 14 | 15 | 16 | 17 | 18 |

FIG.12

PRIOR ART

DYNAMIC IMAGE ENCODING METHOD AND APPARATUS

BACKGROUND OF THE INVENTION

1. Field of the Invention

The present invention relates to a dynamic image encoding method and an apparatus therefor, and in particular to a dynamic image encoding method and an apparatus therefor which apply a hierarchical motion vector detection method.

In accordance with a recent advance of a semiconductor technology, a main function of a dynamic image real time encoder which was formed of a plurality of semiconductor chips has been achieved by only a single chip. In the case where the encoder is realized in the form of hardware, a method of realizing a motion vector detection process which requires a huge amount of operation is an important point to determine cost performance.

2. Description of the Related Art

A variety of motion vector detection methods have been proposed to simultaneously achieve both of the expansion of a motion vector detection area (range) and the reduction of the operation amount. One of the methods is the hierarchical motion vector detection method. In this method, as the first stage (process) of the motion vector detection, reduced screens are generated in each of a current picture and a reference picture for the motion vector detection and then motion vectors are detected between the reduced screens. Then, as the second stage detection between screens with normal resolution, the detection is executed by centering around the area which results from the first stage detection.

This method will be described referring to FIG. 6. For instance, assuming that with respect to a first stage detection area (a) of an input dynamic image of a normal screen size be, the reduced screen of 16×16 pixels obtained at the thinned-out ratio (1/16) of 1:4 in length to breadth be a process unit (b) of the first stage vector detection, a common offset vector (c) to 4×4=16 macro blocks (occasionally abbreviated as MB) is detected in the first stage vector detection.

Then, by each macro block (d) as a second stage detection unit a vector search for a second stage detection area (e) is executed to obtain a second vector (f). Both of the result vectors (c) and (f) at the first and the second stage are added to obtain a final result vector (g).

In this method, the detection accuracy is somewhat lower compared with that in a full search, while the operation amount which is required for the same area detection process is remarkably reduced.

Figure 7:
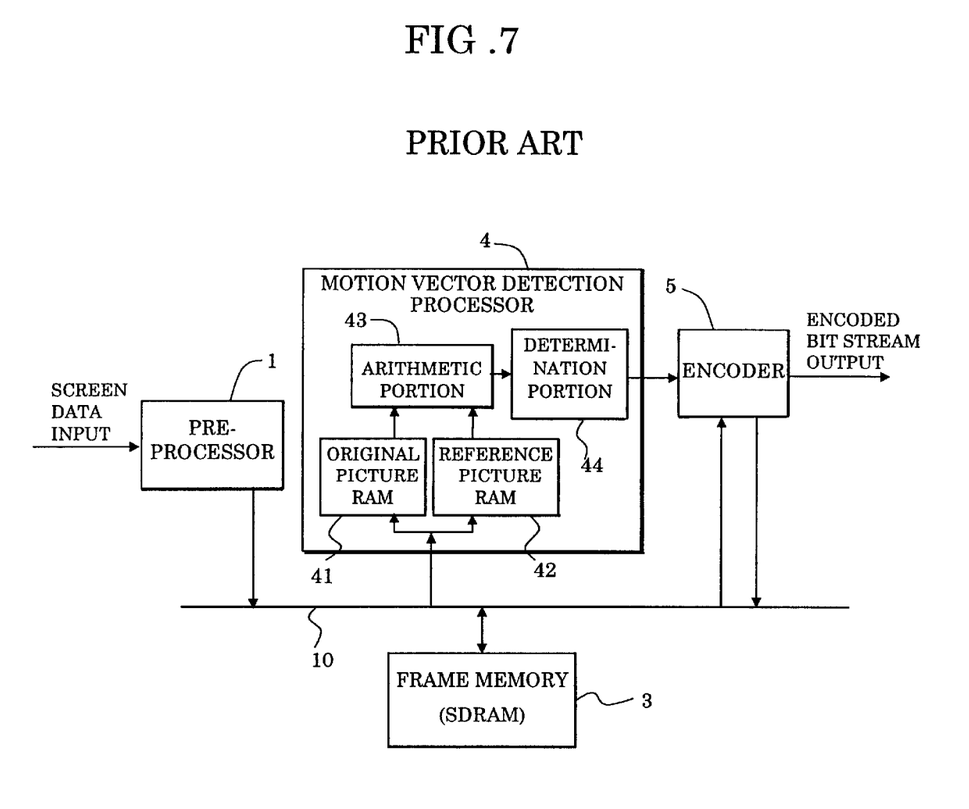
FIG. 7 is a block diagram showing a general arrangement of a one chip video encoder.

One example of such a motion vector detection process which is realized in the form of hardware is shown in FIG. 7, in which a preprocessor 1 which executes a wave shaping of an inputted picture data, a frame memory 3 utilizing an SDRAM which can also be a DRAM and make a high-speed access with a large capacity, a motion vector detection processor 4, and an encoder 5 are mutually connected with a bus 10. The motion vector detection processor 4 is composed of a current picture RAM 41 which stores a current picture data, a reference picture RAM 42 which stores a reference picture data, an arithmetic portion 43 which performs predetermined operations for the data stored in the RAM's 41, 42 as local memories (cashes), and a determination portion (judging unit) 44 which determines or judge the vector resulting from of the operations to be sent to the encoder 5.

Namely, in each macro block, pixel data in rectangular areas of the current picture and the reference picture are read from the frame memory 3 in the local memories which are the internal current picture RAM 41 and the reference picture RAM 42. Then, the arithmetic portion 43 executes the motion vector detection process, and the motion vector thus obtained is determined at the determination portion 44 to be sent to the encoder 5 for the encoding operation.

A vector search area serves as a parameter which controls the encoding characteristics of the encoder. For the achievement of the widest area search it is necessary to read the reference picture areas in the widest area from the frame memory 3 in the RAM 42.

However, a bandwidth of the frame memory 3 (a data transfer performance) becomes a bottleneck, which limits the search area. Therefore, how efficiently screen data on the frame memory 3 can be accessed is important to make the vector search area wider and products more competitive.

In an arrangement of a hierarchical motion vector detection process such as shown in FIG. 7, a reduced screen has to be read from a frame memory in a local memory for the first stage process. Conventionally, from a normal-sized picture some pixels are thinned out in the frame memory and read in the local memory.

However, if the frame memory is an SDRAM, sequential address data of four or eight words are read out at a burst by only one readout command, so that reading out only the thinned-out pixels extremely worsens the memory access efficiency.

Even with a normal DRAM, if a bus width of the frame memory is larger (e.g. 32 bits) than 8 bits of the pixel data which are required to be read in, pixel data which are not required to read in single pixel data are also read in at the same time, which also worsens the efficiency. Moreover, there is a problem that a vector detection accuracy at the first stage decreases only by thinning out the normal-sized image due to the occurrence of a folded distortion.

Figure 8:
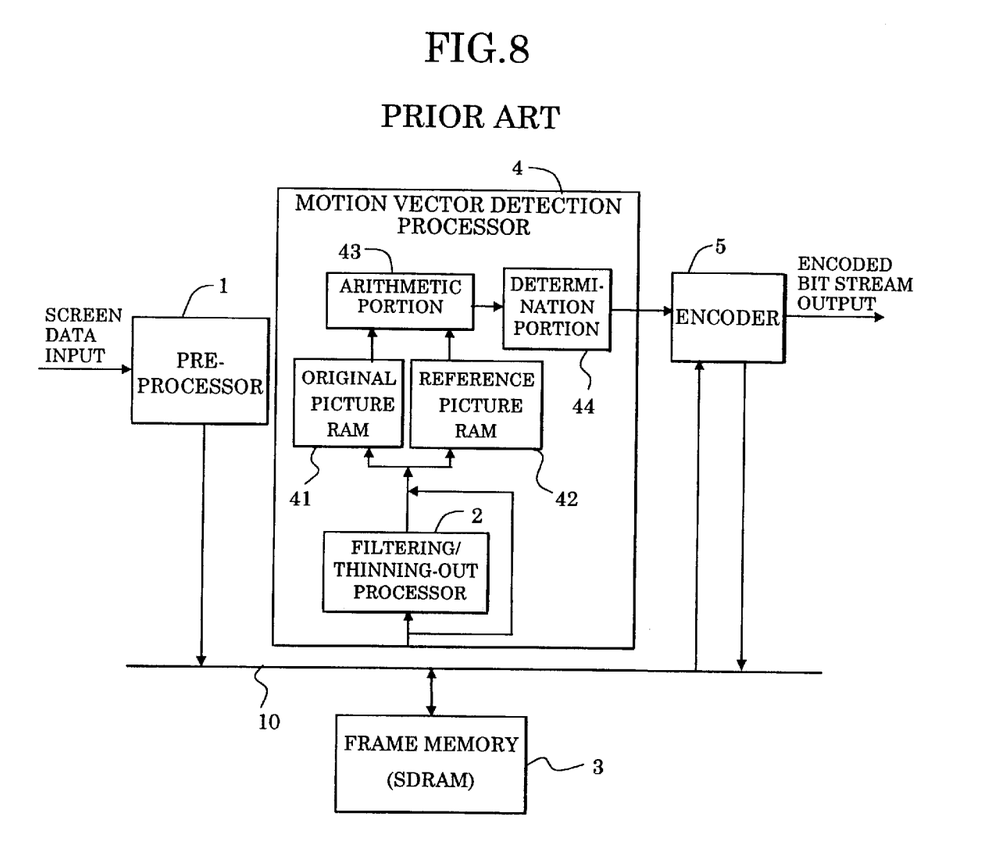
FIG. 8 is a block diagram showing an arrangement of a conventional dynamic image encoding apparatus.

To solve such a problem, an arrangement has been proposed, as shown in FIG. 8, which provides a filtering/thinning-out processor 2 for executing a space filtering and a pixel thinning out process between the RAM's 41,42 and the frame memory 3.

Figure 6:
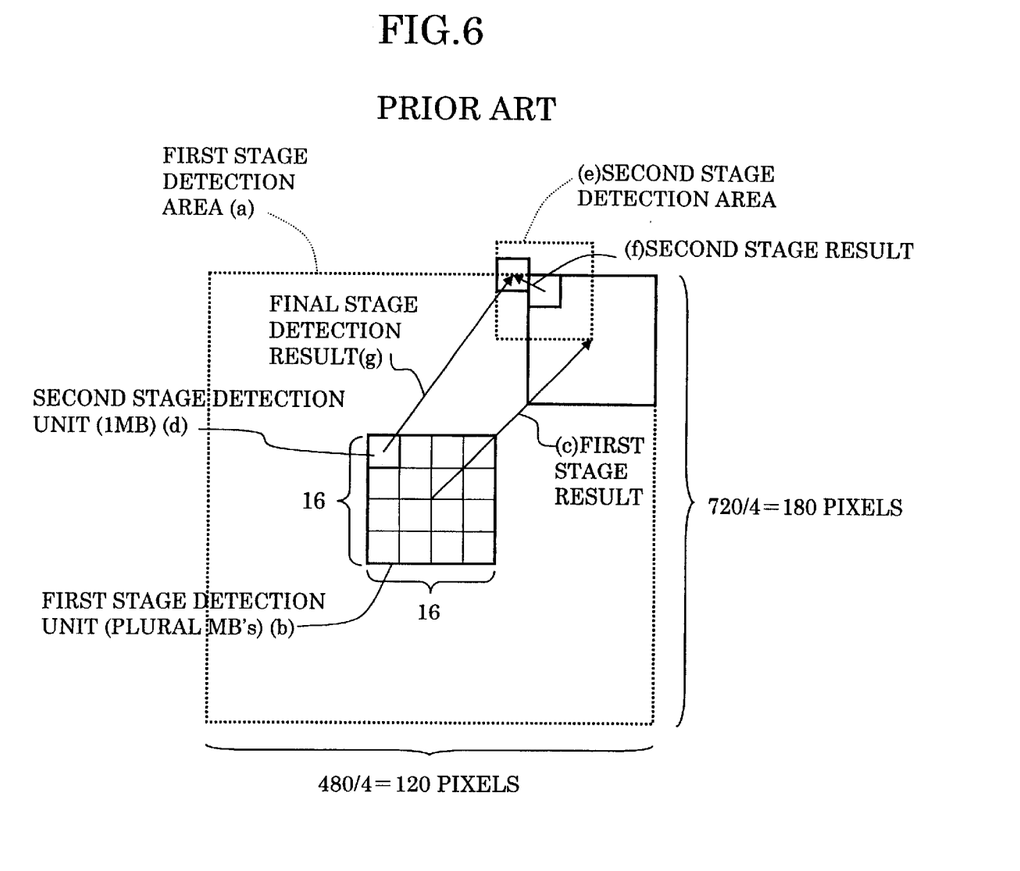
FIG. 6 is a block diagram showing an outline of a hierarchical motion vector detection method as generally known.

In this arrangement, when the reduced screen area (b) at the first stage detection in FIG. 6 is read in the RAM's 41, 42, sequential areas are once read in the filtering/thinning-out processor 2 from the frame memory 3, and then the pixels are thinned out while executing the filtering process.

At the following second stage detection, the normal-sized screen (a) in FIG. 6 is read in the RAM 42 by bypassing the filtering/thinning-out processor 2.

However, in the arrangement of FIG. 8, for reading in the reduced screens at the first stage detection, it is necessary to read in pixel data of area much wider than the size of the original and the reference picture which are originally required. For instance, in order to arrange the reduced screen thinned out at the ratio of 1:4 in length to breadth, 16 times the data amount is required because the surrounding pixels are necessary for the filtering process.

With this method, the problem of memory access efficiency is not only solved but also may be worsened.

Figure 9:
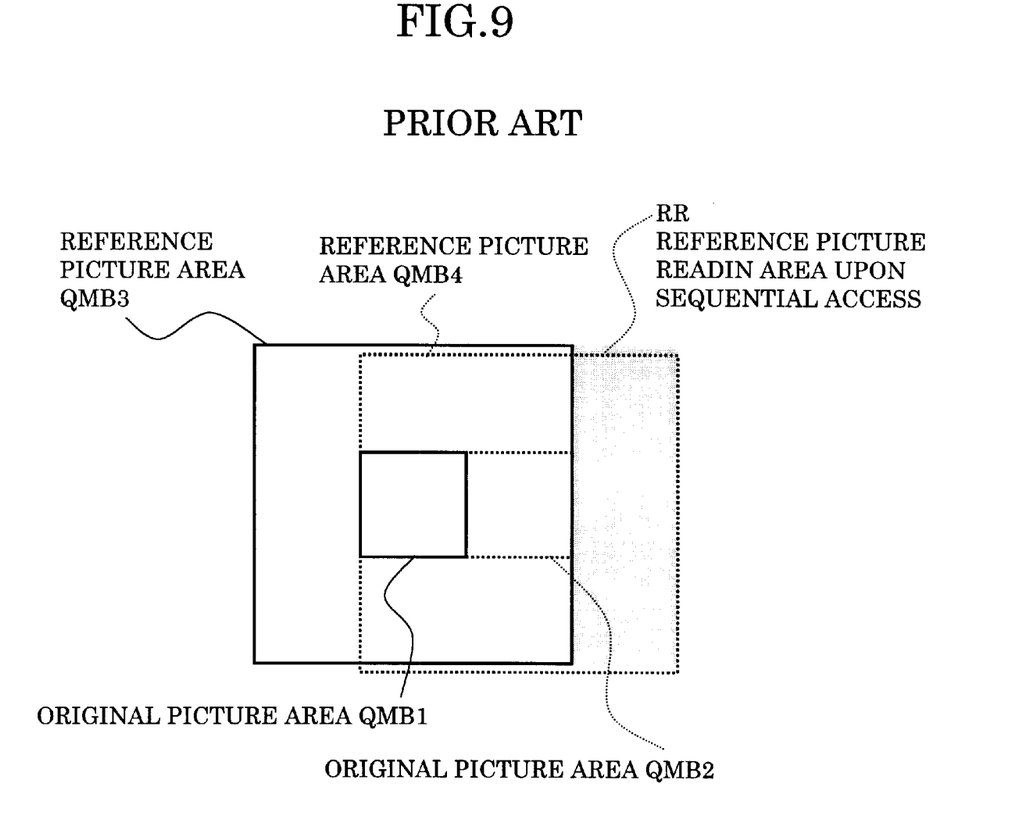
FIG. 9 is a block diagram explaining sequential reading areas of the first stage reference picture.

Also, assuming that the first stage detection process be executed on the reduced screen thinned out at the ratio of 1:4 in length to breadth, the process unit at the first stage (a big macro block abbreviated as QMB) be 16×16 pixels on the reduced screen (i.e. 4 MB×4 MB=16 MB area in the normal-sized screen), and the search area be 16×16 pixels on the reduced screen, the screen size to be read in as the reference screen will be three times, i.e. 48×48, as shown in FIG. 9.

Namely, ⅔ of reference picture areas QMB3 and QMB4 read in the current picture areas QMB1 and QMB2 of adjacent big macro blocks are overlapped. Therefore, by storing only the overlapped areas in the RAM's 41, 42, only the remaining ⅓ area RR has to be read in separately.

Figure 10:
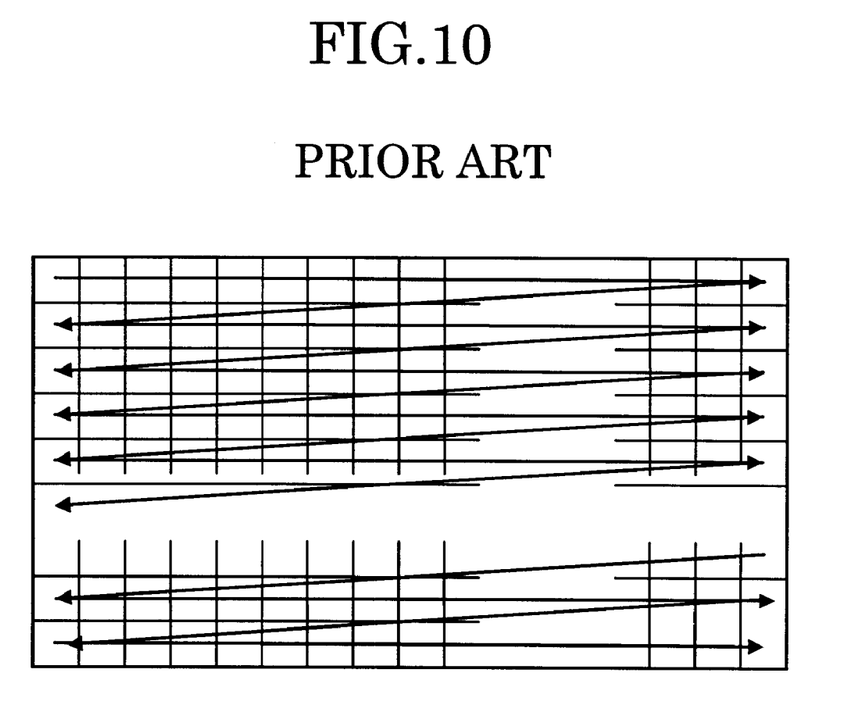
FIG. 10 is a diagram showing an encoding order of a macro block in one screen.

A process schedule of the hierarchical motion vector detection will be described in the following. The encoding process by the encoder 5 is executed for each macro block. In the encoding order as shown in FIG. 10, the top rank of the screen is processed first and the following ranks are then processed to complete the bottom rank. In each rank the process is executed from left to right.

Figure 11:
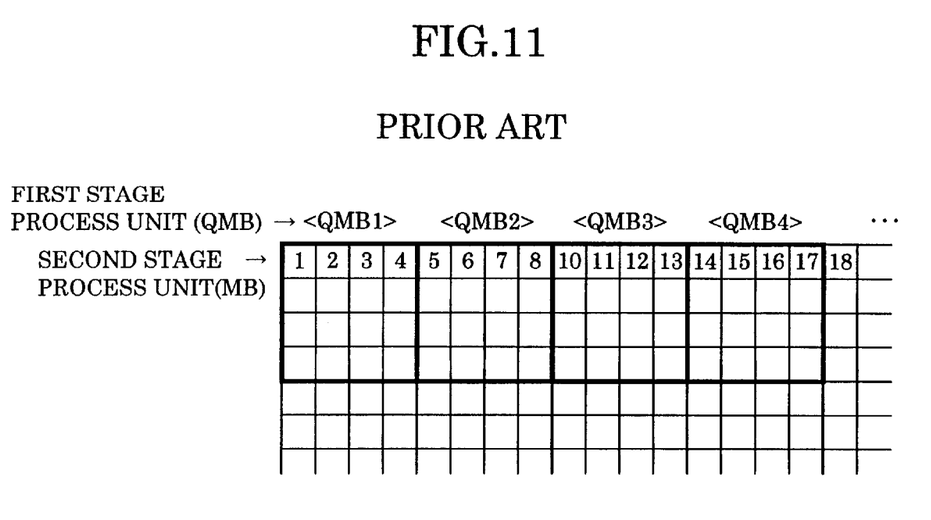
FIG. 11 is a block diagram illustrating process units on a screen of the first and the second stage process.

Accordingly, as shown in FIG. 11, vector values which are gained in the process units QMB1, QMB2, QMB3, and QMB4 at the first stage are used for the second stage process of four ranked macro blocks in the first process unit QMB, and are then saved in the RAM's 41, 42. Subsequently, the first stage process of the next right area will be executed in the same manner.

Figure 12:
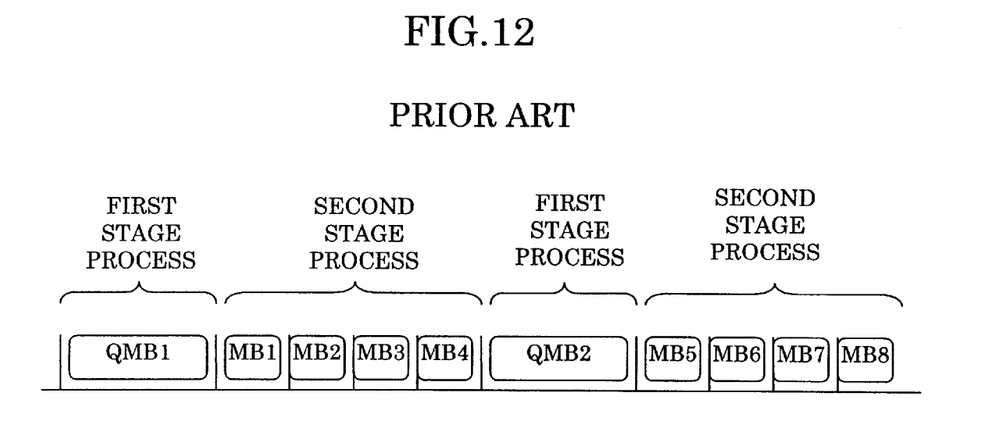
FIG. 12 is a diagram showing a conventional hierarchical motion vector detection process schedule.

Specifically, as shown in FIG. 12, after the first stage process for the big macro block QMB1, the second stage process is executed within this big macro block QMB1 for four macro blocks MB1–MB4 per a macro block unit MB. Thus, the following motion vector detection processes are executed in the order of the big macro block QMB2+macro blocks MB5–MB8, and so on.

However, the problem is that the reference picture data at the first stage which is desired to be stored in the RAM's 41, 42 are overwritten and extinguished with the data at the second stage process because the processes at the first and the second stage are required to be alternately done. Namely, when the macro blocks in the next rank shown in FIG. 11 are processed after the second stage process for one rank of macro blocks MB1–MB18 has been executed, the first stage process must be again executed despite of the same first stage process being not required to be done essentially because the big macro blocks QMB1, QMB2, QMB3, and QMB4 have the same data.

Accordingly, every time the first stage process is executed all of the reference area data must be reread in, resulting in inefficient memory access. If the reference picture memories are provided separately for the first and the second stage process, the problem will be solved, which leads to an increase of a hardware scale and electric power consumption.

Thus, in the prior art, if the hierarchical motion vector detection method is realized in the form of hardware which uses the SDRAM as a frame memory, there is a problem that the access bandwidth of the SDRAM cannot be used efficiently to read out the reduced screen. Also, because of the process schedule in which the first and the second stage process are alternately executed, it is necessary to reread the area data of the overlapped reference picture at the first stage process every time, resulting in inefficient memory access.

SUMMARY OF THE INVENTION

It is accordingly an object of the present invention to provide a dynamic image encoding method and an apparatus therefor which apply to a hierarchical motion vector detection process using a frame memory in which the frame memory can be efficiently accessed.

In order to achieve the above-mentioned object, a dynamic image encoding method according to the present invention comprises the steps of; executing a precedent process sequentially for one rank of a reduced screen obtained by thinning out an input screen, storing a result of the precedent process in the frame memory; executing a subsequent process between input screens sequentially for macro blocks in the reduced screen having provided the result of the precedent process; and repeating the precedent and the subsequent process.

Namely, in the present invention, as a precedent process (the first stage process), a motion vector detection process is executed between reduced screens for which a filtering/thinning-out process is executed between normal-sized input screens, and then as a subsequent process (the second stage process), a motion vector detection process is executed between normal-sized screens in each macro block based on the result of the precedent process, whereby the hierarchical motion vector detection method is applied.

On the assumption of such a hierarchical motion vector detection method, the precedent process is sequentially executed for one rank of the reduced screen, and then the subsequent process is sequentially executed between the input screens for the macro blocks in the reduced screen from which the result of the precedent process is obtained. Thus, the precedent and the subsequent process are repeated.

In this way, at the precedent process, only for the reduced screen at the left end of the screen all of the areas of a reference picture screen are read from the frame memory (e.g. in a motion vector detection processor). Then, only a new area appeared after shifting has to be read in. By devising the schedule of the precedent and the subsequent process, it becomes possible to avoid rereading in the first stage overlapped area. As a result, the efficiency of the memory access improves.

Also, in parallel with the process of storing the input screen in the frame memory, the filtering/thinning-out process of the input screen may be executed to store pixel data of the reduced screen in the frame memory so that the precedent process may be executed for the reduced screen.

Namely, by arranging the reduced screen for which the filtering/thinning-out process is preliminarily executed on sequential addresses of the frame memory, access is made possible which takes advantage of a characteristic of a frame memory such as an SDRAM or DRAM.

Also, an encoding process may be executed in synchronization with the subsequent process. By generating and writing staff bits in a memory within a term of the precedent process the encoding process may be executed efficiently.

Moreover, the encoding process may be executed asynchronously between adjacent ones of the precedent process, which can extend the encoding process term and correspond to a change of the precedent process term.

To achieve the above-mentioned dynamic image encoding method according to the present invention, a dynamic image encoding apparatus according to the present invention comprises a motion vector detection processor in which a precedent process is executed sequentially for one rank of a reduced screen obtained by thinning out an input screen, and after storing a result of the precedent process in the frame memory, a subsequent process is executed between input screens sequentially for macro blocks in the reduced screen having provided the result of the precedent, and the precedent and the subsequent process are repeated.

In this apparatus, in parallel with storing the input screen in the frame memory, the input screen may be filtered and thinned out to store pixel data of the reduced screen in the frame memory so that the precedent process may be executed for the reduced screen.

Also, the apparatus may be provided with an encoder which executes an encoding process in synchronization with the subsequent process, and during the precedent process the encoder may generate and write staff bits in a memory.

Moreover, the apparatus may be provided with a buffer memory to execute the encoding process asynchronously between adjacent ones of the precedent process.

BRIEF DESCRIPTION OF THE DRAWINGS

Throughout the figures, like reference numerals indicate like or corresponding components.

DESCRIPTION OF THE EMBODIMENTS

An embodiment of a dynamic image encoding method and an apparatus therefor according to the present invention will now be described referring to the attached drawings.

Figure 1:
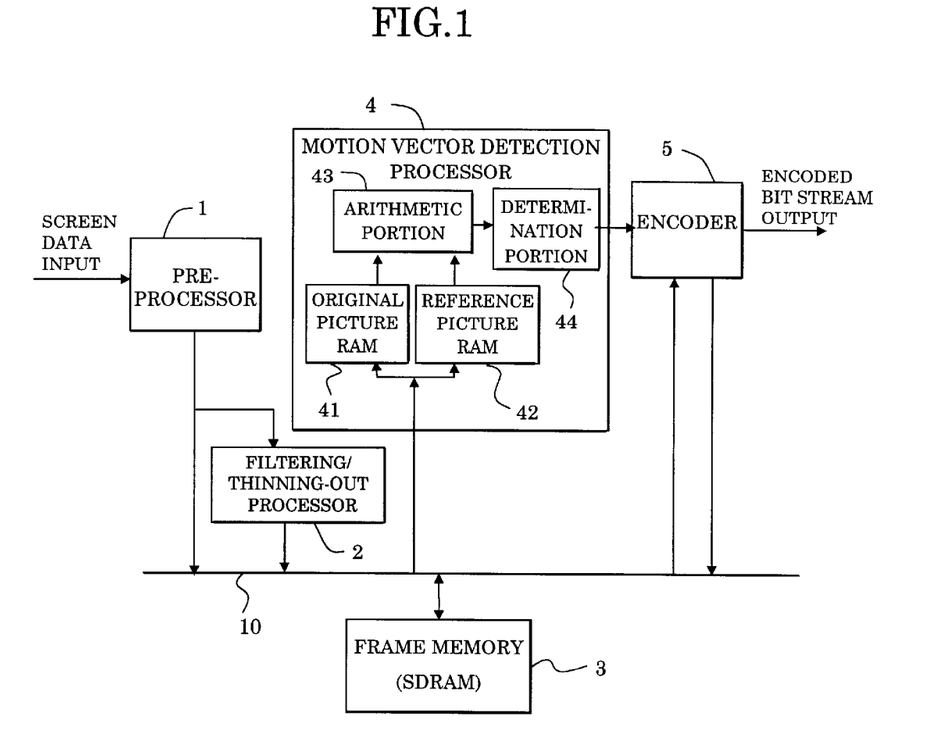
FIG. 1 is a block diagram showing an arrangement (1) of an apparatus which executes a dynamic image encoding method according to the present invention.

FIG. 1 shows an arrangement of the apparatus for the execution of the dynamic image encoding method according to the present invention. In this embodiment, it is different from the prior art shown in FIG. 8 that the filtering/thinning-out processor 2 is not provided in the motion vector detection processor 4 but is connected between the output of the preprocessor 1 and the common bus 10.

An operation of this dynamic image encoding apparatus will be described in the following.

First of all, in parallel with the process of writing input image data in the frame memory 3, the input image data is sent to the filtering/thinning-out processor 2 in which the filtering and the thinning-out process are executed. Then, the reduced screen data after the filtering and the thinning-out process are written in another area of the frame memory 3 which is different from the area where the input screen data of a normal size is stored.

The hierarchical motion vector detection processor 4 reads current picture data and reference picture data from the reduced screen data preliminarily stored in the frame memory 3 in the RAM's 41, 42, respectively whereby the first stage detection process is executed as mentioned above with reference to the prior art. In this case, the reduced screen data can be mapped in sequential areas of the RAM's 41, 42, which enables an efficient memory access in the SDRAM frame memory 3.

Figure 2:
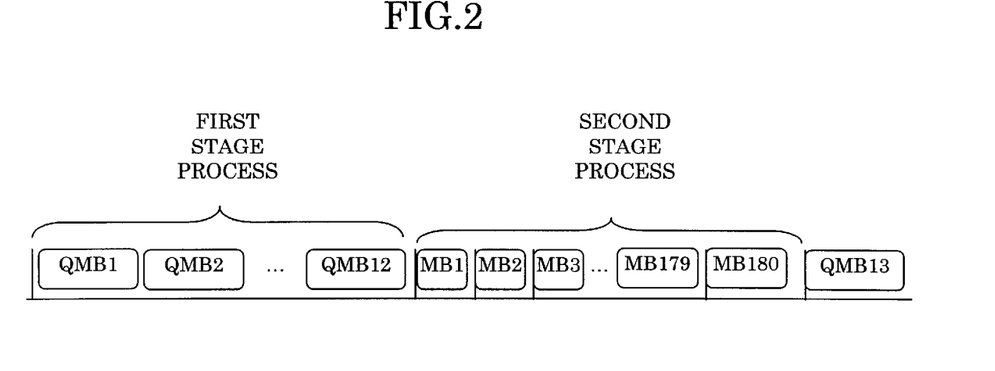
FIG. 2 is a diagram showing a hierarchical motion vector detection process schedule according to the present invention.

Also, as shown in FIG. 2, a process schedule is devised in order to increase the efficiency of reading access of the reference screen data at the first stage process. First of all, the first stage process is executed sequentially for one rank, and the result is reserved in the local memory. Then, the second stage process is sequentially executed.

For instance, as mentioned above, if 16×16 pixel area of the reduced screen (180×120 pixels) thinned out at the ratio of 1:4 with respect to normal input screen of 720×480 pixels is assumed to be a process unit (a big macro block), in the screen shown in FIG. 11 the first stage process is executed 12 times (≈180/16) sequentially about the big macro blocks QMB1, QMB2, QMB3, . . . , and QMB12. Then the second stage process is executed sequentially for 45 (≈720/16)×4= 180 macro blocks (MB1-MB12). Thus, about the following big macro blocks QMB 13 , the same process is repeated In this process, since the reference pictures necessary for the first stage process are overlapped in adjacent ones of the big macro block, the big macro block at the left end has only to read in all of the reference picture area while the other eleven big macro blocks have only to read in a new area appeared after shifting (see the area RR shown in FIG. 9). This enables the efficiency of the memory access to be enhanced.

The schedule of the entire encoding process which applies to the hierarchical motion vector detection process as above-mentioned will be described referring to FIG. 3.

Figure 3:
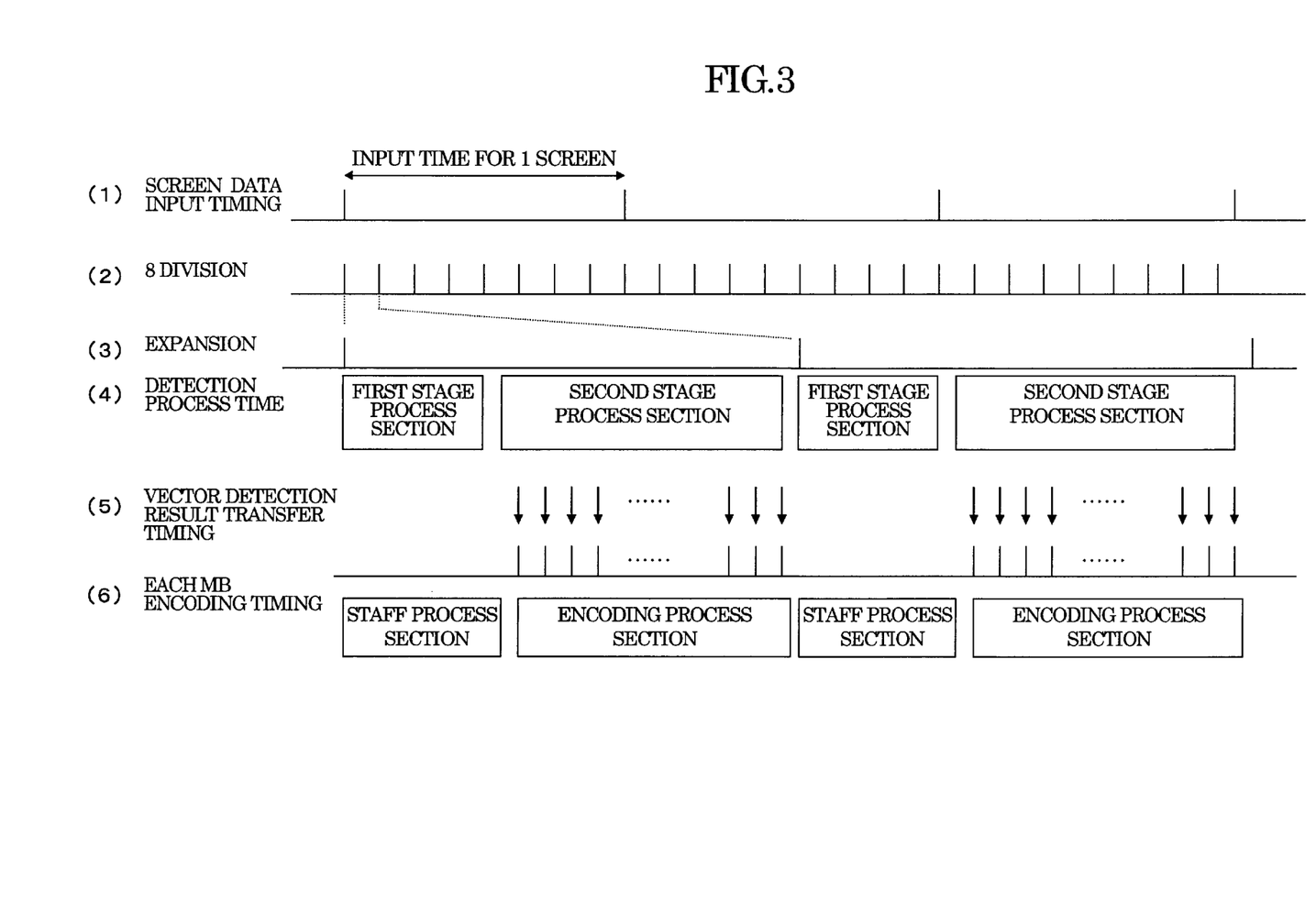
FIG. 3 is a time chart showing a dynamic image encoding process schedule (1) according to the present invention.

In the above-mentioned screen size of 720×480 pixels, if the 16×16 pixel area of the reduced screen (180×120 pixels) thinned out at the ratio of 1:4 is assumed to be a process unit (a big macro block) at the first stage process, the first stage process of one rank is executed 8 times(≈120/16) in order to complete the process for a single screen as inputted, as shown in FIG. 3 (2).

Every time the second stage process for each macro block is completed as shown in FIG. 3 (3), (4), a final motion vector is obtained as shown in FIG. 3 (5) so that the encoding process is executed as shown in FIG. 3 (6).

Therefore, in a term for which the first stage process of the motion vector detection is executed, the encoding process is not executed, providing a margin for a bandwidth of memory. As shown in FIG. 3 (6), if staff bits for encoding rate adjustment are generated at a burst by utilizing this term in the encoder 5, a higher efficiency will be obtained.

Also, if the process term of the first stage is long enough compared with the second stage process term, the encoder 5 may have a bad influence because the encoding term of each macro block corresponding to the second stage process is shortened.

Figure 4:
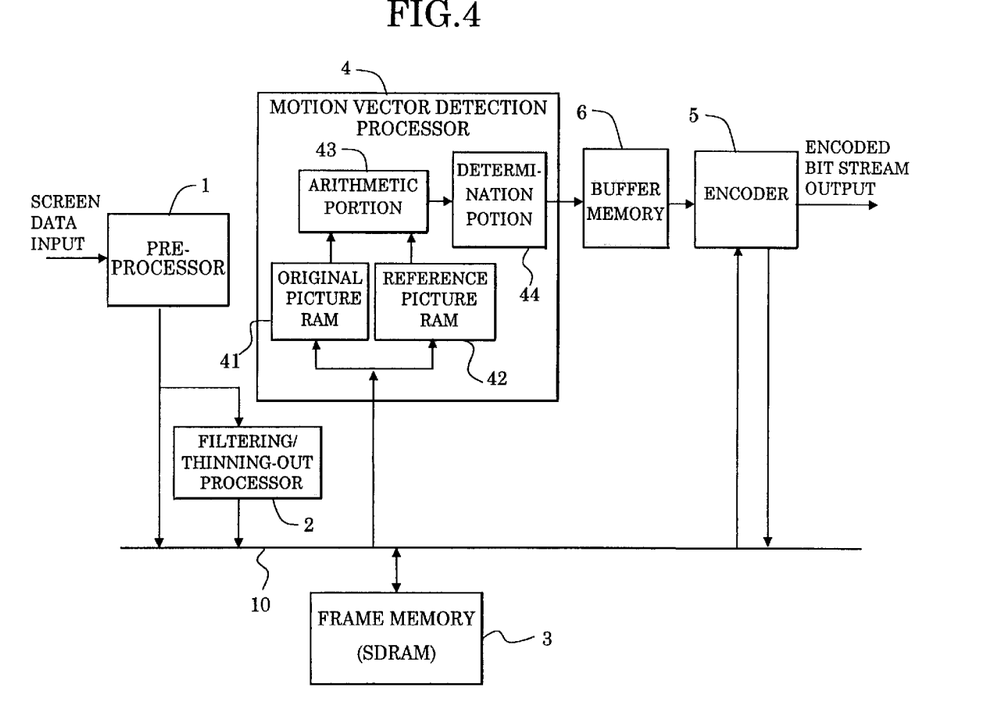
FIG. 4 is a block diagram showing an arrangement (2) of an apparatus which executes a dynamic image encoding method according to the present invention.
Figure 5:
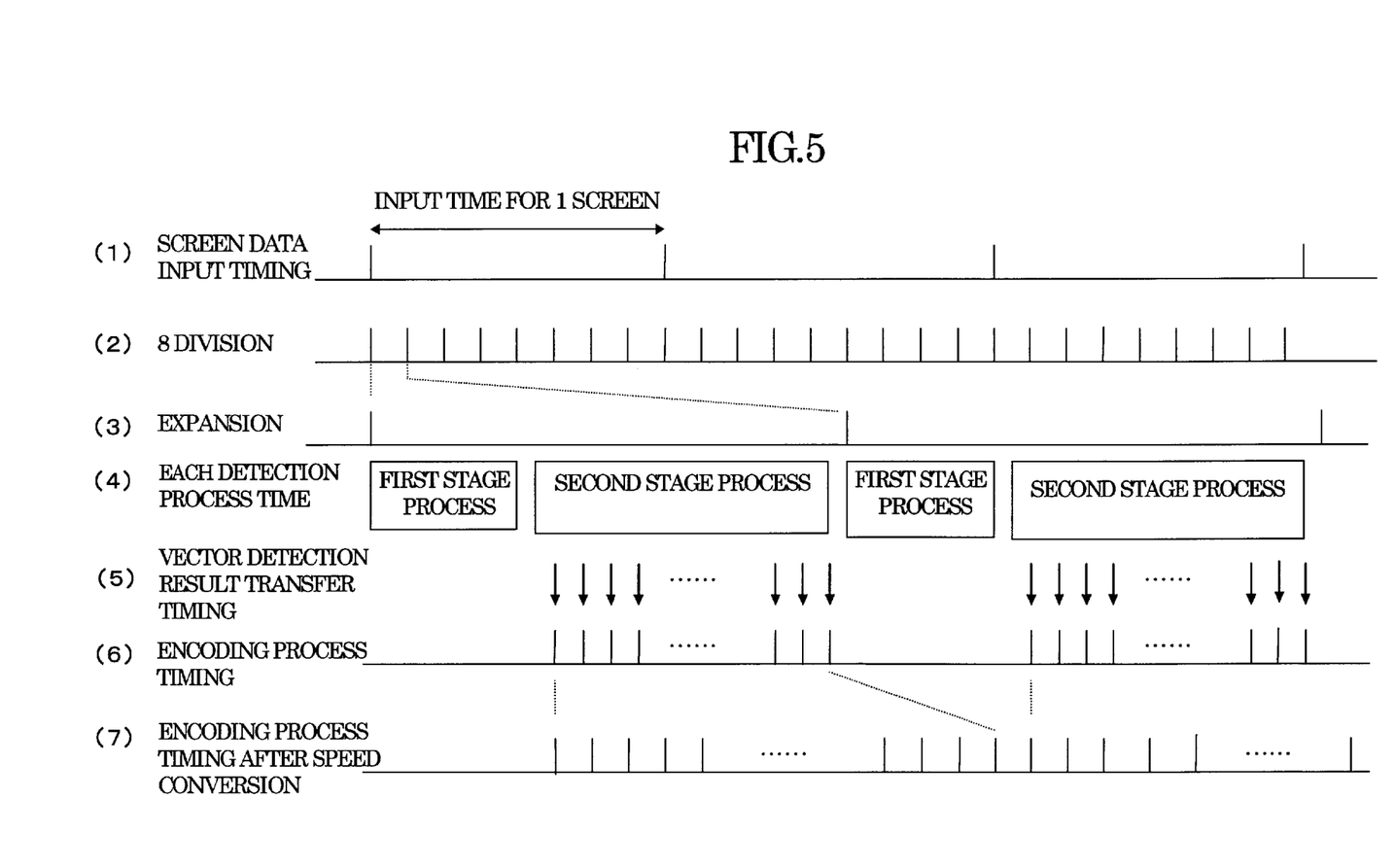
FIG. 5 is a time chart showing a dynamic image encoding process schedule (2) according to the present invention.

Therefore, as shown in FIG. 4, if a buffer 6 is installed between the motion vector detector 4 and the encoder 5 and vector values outputted from the vector detector 4 are sent to the encoder 5 after buffered and changed in speed, it becomes possible to conceal a dead zone of the first stage detection term and expand the encoding process term, as shown in the encoding schedule of FIG. 5 (7).

As described above, a dynamic image encoding method and an apparatus therefor according to the present invention is arranged so that a precedent process is executed sequentially for one rank of a reduced screen obtained after thinning out an input screen to memorize the result, and then the subsequent process is sequentially executed between the input screens for macro blocks of the reduced screen having provided the result of the precedent process so that the precedent and the subsequent process are repeated. Therefore, it becomes possible to improve the memory access efficiency of a real time encoder which applies to a hierarchical motion vector process method and to make the products more competitive.

What we claim is:

1. A dynamic image encoding method for executing a hierarchical motion vector detection process using a frame memory, comprising:

executing a precedent process sequentially for a rank of reduced screens obtained by thinning out an input screen;

storing a result of the precedent process in the frame memory;

executing a subsequent process between input screens sequentially for all macro blocks included in the rank of the reduced screens having provided the result of the precedent process without requiring the precedent process for the rank of the reduced screens during the subsequent process; and repeating the precedent and the subsequent process.

2. The dynamic image encoding method as claimed in claim 1, wherein in parallel with storing the input screen in the frame memory, the input screen is filtered and thinned out to store pixel data of the reduced screen in the frame memory so that the precedent process is executed for the reduced screen.

3. The dynamic image encoding method as claimed in claim 1, wherein an encoding process is executed in synchronization with the subsequent process.

4. The dynamic image encoding method as claimed in claim 1, wherein during the precedent process staff bits are generated and written in a memory.

5. The dynamic image encoding method as claimed in claim 2, wherein during the precedent process staff bits are generated and written in a memory.

6. The dynamic image encoding method as claimed in claim 3, wherein the encoding process is executed asynchronously between adjacent ones of the precedent process.

7. A dynamic image encoding apparatus which executes a hierarchical motion vector detection process using a frame memory, comprising:

a motion vector detection processor in which a precedent process is executed sequentially for a rank of reduced screens obtained by thinning out an input screen, and after storing a result of the precedent process in the frame memory, a subsequent process is executed between input screens sequentially for all macro blocks included in the rank of the reduced screens having provided the result of the precedent process without requiring the precedent process for the rank of the reduced screens during the subsequent process, and the precedent and the subsequent process are repeated.

8. The dynamic image encoding apparatus as claimed in claim 7, further comprising a filtering/thinning-out processor in which in parallel with storing the input screen in the frame memory, the input screen is filtered and thinned out to store pixel data of the reduced screen in the frame memory so that the motion vector detection processor executes the precedent process for the reduced screen.

9. The dynamic image encoding apparatus as claimed in claim 7, further comprising an encoder for executing an encoding process in synchronization with the subsequent process.

10. The dynamic image encoding apparatus as claimed in claim 9, wherein the encoder generates and writes staff bits in a memory during the precedent process.

11. The dynamic image encoding apparatus as claimed in claim 9, further comprising a buffer memory for executing the encoding process asynchronously between adjacent ones of the precedent process.

12. The dynamic image encoding apparatus as claimed in claim 10, further comprising a buffer memory for executing the encoding process asynchronously between adjacent ones of the precedent process.

* * * * *